United States Patent [19]

Beissbarth

[11] Patent Number: 4,625,419
[45] Date of Patent: Dec. 2, 1986

[54] WHEEL ALIGNMENT MEASURING APPARATUS

[76] Inventor: Osmond Beissbarth, Sulzbacherstrasse 15, 8000 Munich 40, Fed. Rep. of Germany

[21] Appl. No.: 700,019

[22] Filed: Feb. 8, 1985

[30] Foreign Application Priority Data

Feb. 8, 1984 [EP] European Pat. Off. ........ 84101304.8

[51] Int. Cl.⁴ ..................... G01B 5/255; G01B 7/315
[52] U.S. Cl. .............................. 33/203.17; 33/203.15; 33/DIG. 1
[58] Field of Search ........... 33/203.15, 203.16, 203.17, 33/203.18, 203.19, 203.2, 203.21, 288, DIG. 1

[56] References Cited

U.S. PATENT DOCUMENTS

| | | | |
|---|---|---|---|
| 2,292,969 | 8/1942 | Peters | 33/DIG. 1 |
| 2,532,593 | 12/1950 | Bender et al. | 33/DIG. 1 |
| 2,899,753 | 8/1959 | Hair | 33/203.21 |
| 3,417,479 | 12/1968 | Hirmann | 33/203.17 |
| 3,546,782 | 12/1970 | Pereue et al. | 33/203.17 |
| 3,793,736 | 2/1974 | Gufrini | 33/203.17 |
| 4,457,075 | 7/1984 | Murata | 33/203.15 |

FOREIGN PATENT DOCUMENTS

| | | | |
|---|---|---|---|
| 1317694 | 1/1963 | France | 33/203.17 |
| 149441 | 3/1955 | Sweden | 33/DIG. 1 |
| 1330404 | 9/1973 | United Kingdom | 33/203.15 |

Primary Examiner—Richard R. Stearns
Attorney, Agent, or Firm—Birch, Stewart, Kolasch & Birch

[57] ABSTRACT

The wheel alignment checking apparatus for use on a pair of wheels on a motor vehicle uses gage disks adapted to be secured to the wheels to be examined, a transverse support yoke, measuring plates mounted perpendicularly thereon and at least one angle measuring device mounted on one plate, for example by way of magnetic probes, so that one end of the device is on the plate and a head of the device engages the respective gage disk and any angle between the plane of the disk and of the adjacent plate is converted by a rotary potentiometer, for example, into a signal which may be read directly or after offsetting against other signals in a known way.

11 Claims, 8 Drawing Figures

WHEEL ALIGNMENT MEASURING APPARATUS

BACKGROUND OF THE INVENTION

The invention relates to wheel measuring apparatus for ascertaining the angular setting or alignment of a pair of wheels of a motor vehicle using gage disks adapted to be applied to the wheels perpendicular to their axes of rotation and at least one angle measuring device mounted on a tie yoke and with which the angular setting of the gage disk in relation to a perpendicular to the direction of in which the motor vehicle is pointing may be measured.

DISCUSSION OF THE PRIOR ART

One form of such measuring apparatus has been proposed in the Swiss Pat. No. 424,288 using a connecting yoke having two measuring heads with a number of probe members for determining the inclination of the axes of the wheels. Measuring plate members, to be fixed to the wheels, can to be adjusted in two dimensions in order to be able to set the measuring plate members in a direction normal to the respective wheel bearing axis. After alignment of the yoke so as to be perpendicular to the axis of symmetry of the motor vehicle and after aligning the measuring plate members in a direction normal to the wheel bearing axis, the measuring heads, each having a number of probe members, were to be moved towards measuring plate members, the probe members then responding to the desired angles. In the case of such a measuring apparatus the accuracy of the measurement was dependent on the measuring plate members being aligned so as to be precisely perpendicular to the wheel bearing axis, something that proved to be only possible under normal working conditions if the vehicle was jacked up and the wheels turned. However both these steps of jacking up and turning the wheels are heavy on labor and power requirements in the case of large vehicles such as trucks and omnibuses.

SHORT SUMMARY OF THE INVENTION

On the other hand one object of the present invention is to devise a simple and sturdy measuring apparatus with which the angular setting, more particularly toe-in, of a pair of wheels, may be precisely ascertained.

In order to effect this or further objects disclosed herein the wheel alignment measuring apparatus of the present invention is so designed that measuring plates are arranged on the yoke perpendicularly thereto, such plates extending horizontally as far as positions under the respective associated gage disk when the yoke is applied to the vehicle in the operational position, and the angle measuring device comprises a housing, a head pivoting about an axis of the housing and a transducing unit provided to sense the degree of pivot of the head around the housing axis; furthermore the angle measuring device is adapted to be placed in a generally upright position with the housing on the measuring plate and the head on the gage disk associated with the measuring plate in order to measure the angle between the surface of the measuring plate and the surface of the gage disk.

Consequently in the measuring apparatus of the invention a measuring plate, that is mounted on the yoke, is moved into place next to the gage disk on the wheel whose alignment is to be investigated, and the angle measuring devices ascertain the angles between the surface of the gage disk and the surface of the associated measuring plate in a vertical direction. Using the alignment apparatus of the present invention it is not necessary to adjust the gage disks to be exactly parallel to the wheel mounting plate, i.e., the member on which the wheel is mounted, so that a source of error is cut out because no such adjustment is to be undertaken. In fact, the angles may be measured with simply constructed and simple-to-use, sturdy measuring instrumentalities.

A preferred form of the invention comprises stands on the housing and on the head of the angle measuring device, such stands being adapted to be pivoted about a direction perpendicular to the said axis of the housing. This development of the invention is beneficial inasfar as it is then possible to allow for or to take up a distance between the surface of the measuring gage and the surface of the measuring plate without stressing the parts of the angle measuring device and without any loss in the accuracy of measurement.

As part of a further preferred development of the innovation, the angle transducing unit may be in the form of a rotary potentiometer, this offering the advantage of simplicity so that the rocking motion of the head is exactly measured by applying the foot fixed thereto directly and without any further mechanical devices therebetween so that the reading taken will have a high degree of accuracy.

The gage disk and the measuring plate may be made of iron or like magnetic material and the stands may have permanent magnets for attachment to the gage disks and the measuring plates.

This design then results in the further advantage that it is then a particularly simple matter to position the angle measuring devices on the gage disk and the measuring plates; and furtheremore because of the diameter of the gage disks and the breadth of the measuring plates there is then more freedom as regards the placing of the angle measuring devices, this being a valuable feature when the measuring apparatus is used with different types of vehicles.

In certain cases it may be possible to use only one angle measuring device, the same then being used sequentially in the different measuring positions. When using but one measuring device in this way it is advantageous if the angle measuring device is fitted with an electrical angle readout or display unit. In this connection it is furthermore beneficial if the angle measuring device is fitted with a two-way switch joined with the electrical measuring circuit in order to display or indicate the reading with the respective plus or minus prefix. This makes it possible not only to display the readings algebraically but furthermore to see at a glance whether it is a question of positive or negative amounts.

All these developments as noted so far are in connection with ascertaining the toe-in angle of a vehicle. However, as a further possible outgrowth of the invention, the yoke may have further, upright measuring plates placed on it placed so that they extend up past the associated gage disks when the yoke is positioned in its operating position on the vehicle, the angle measuring device being placed approximately on the level and being able to be placed on the one hand on the gage disk and on the other and on the associated measuring plate in order to measure camber. It is furthermore possible to have two angle measuring devices mounted on one gage disk and its associated measuring plates, the one angle measuring device being placed to measure the toe-in angle with its longitudinal axis upright and the other angle measuring device being placed with its longitudinal axis on the level for measuring camber. The output values are then fed to a processing unit for derivation of readings or outputs from the output signals of the transducer units.

It is furthermore possible for the horizontal measuring plates to have mounts for projectors to check the alignment of the yoke with respect to the axis of symmetry of the vehicle.

An account will now be given of working examples of the invention using the accompanying drawings.

LIST OF THE VARIOUS VIEWS OF THE DRAWINGS

DETAILED ACCOUNT OF WORKING EXAMPLES OF THE INVENTION

Figure 1:
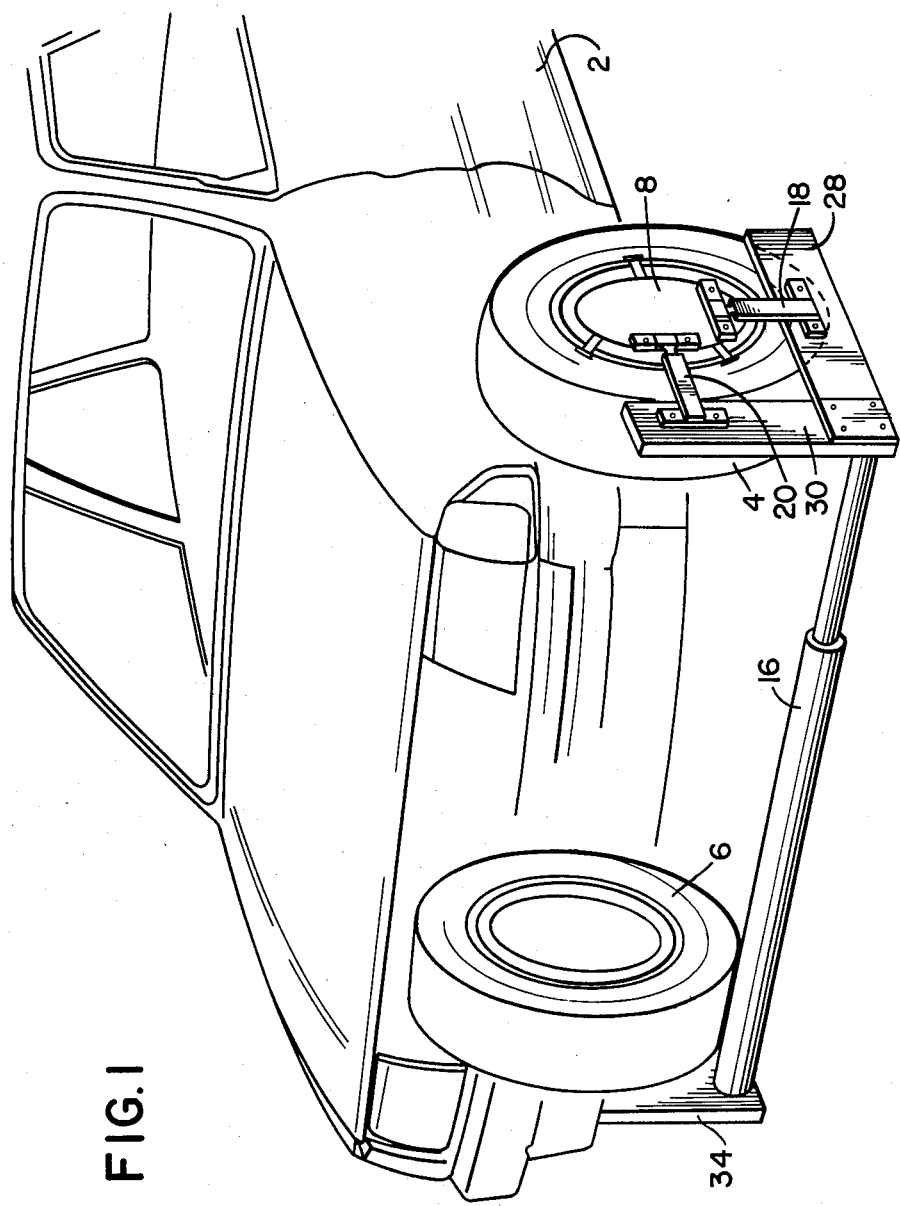
FIG. 1 is a diagrammatic view of the front of a motor vehicle with the measuring apparatus installed.

FIG. 1 diagrammatically illustrates the front of a motor vehicle 2 with front wheels 4 and 6. The main parts of the measuring apparatus are applied to the front wheels, such parts including a gage disk 8 on the nearside front wheel 4, a gage disk 10 (see FIG. 2) on the offside front wheel 6, measuring plates 28, 30; and 32, 34 on the nearside and offside front wheels respectively, a connection yoke 16 that provides a connection between the measuring plates and maintains them parallel to each other, and angle measuring devices 18 and 20 on the nearside front wheel and angle measuring devices 22 and 24 (FIG. 2) applied to the offside front wheel. The measuring apparatus is completed by a processor (not illustrated), in which the output signals from the angle measuring devices are processed to give a display of the readings for camber and toe-in.

The gage disks 8 and 10 are firmly joined to the wheels 4 and 6 by means of three-armed mounts 26. The mounts 26 have to be able to be turned through half a turn with the wheels 4 and 6 without changing their positions on them. The mounts 26 may be in the form of mechanically acting clips or better in the form of double ended magnets, that are inserted between the wheel and the respective gage disk. The mounts 26 do not need any special adaptation to allow for any wobble of the wheel. Apart from the effect of any wobble the outer faces of the gage disks 8 and 10 are therefore normal with respect to the axis of rotation of the respective wheels. The gage disks 8 and 10 have flat, machined outer faces and may be made thin because they are only subject to light loads.

As regards the design of the yoke 16 there are two possibilities. The yoke 16 may for example be in the form of two telescoping parts, on whose ends the measuring plates 28, 30; 32 and 34 are placed so as to be perpendicular to the length direction of the yoke 16 and parallel to each other. Because the yoke 16 may be telescoped the measuring plates 28, 30; 32 and 34 may be moved towards the plane of the gage disks 8 and 10 on the wheels. The yoke 16 is normal to the direction the vehicle is pointing and to the front of the wheels 4 and 6 whose alignment is to be examined and if necessary rectified. The measuring plates 28 and 32 are aligned so as to be level, whereas the other measuring plates 30 and 34 are aligned so as to be upright. The horizontal measuring plates 28 and 32 extend from the yoke 16 as far as points under the axis of turning of the front wheels or under the respective gage disk, and the upright measuring plates 30 and 34 extend from the yoke 16 as far as the level of the axis of turning of the respective wheel or as far as the respective gage disks thereon. Consequently it is then possible for the even outer face of the measuring plates to be placed respectively generally under or in front of the plane of the gage disks 8 and 10 mounted on the wheels. This position of the measuring plates may be set by means of a clamp (not illustrated) on the yoke 16 by locking the telescoping parts of the yoke 16 in relation to each other for example. The adjustability of the yoke 16 furthermore makes it possible to measure angles on motor vehicles with different sizes of wheel track. In order to make it easier to move the yoke with the measuring plates up to the vehicle, the yoke 16 may be fitted with casters (not shown). The yoke 16 may furthermore be in the form of section material with a length exceeding the breadth of the vehicle and on which the two riders, that carry the horizontal measuring plates 28 and 32 or all our measuring plates 28, 30, 32 and 34, may be mounted and clamped in place to be in accord with the breadth of the vehicle.

The angle measuring devices 18, 20, 22 and 24 serve to ascertain the angles between the planes of the surface of the measuring plates 28, 30; 32 and 34 and the planes of the surfaces of the gage disks 8 and 10. The angle measuring devices 18 and 22 (see FIGS. 1 and 2) are placed vertically, straddle the gap between the gage disks 8 and 10 and the measuring plates 28 and 32 and serve to ascertain the toe-in angle, that is to say the angle between one gage disk and the associated measuring plate in a level plane. The angle measuring devices 20 and 24 on the other hand are placed horizontally, straddle the gap between the gage disks 8 and 10 and the upright measuring plates 30 and 34 and serve to measure the camber, viz., the angle between the gage disk and the respective measuring plate in a vertical plane. Consequently the working example of the invention described above with reference to the figures as a form of the measuring apparatus makes it possible to measure not only the camber by also to measure the toe-in angle. Nevertheless it is to be borne in mind that the simplified design of the measuring apparatus, in which merely the measuring plates 28 and 32 are mounted on the yoke 16, constitutes a fully functional apparatus for measuring the toe-in angle of a vehicle, and as such may be used for wheel adjustment if only measurement of the toe-in angle is desired, as may well be the case with trucks and omnibuses.

Figure 3:
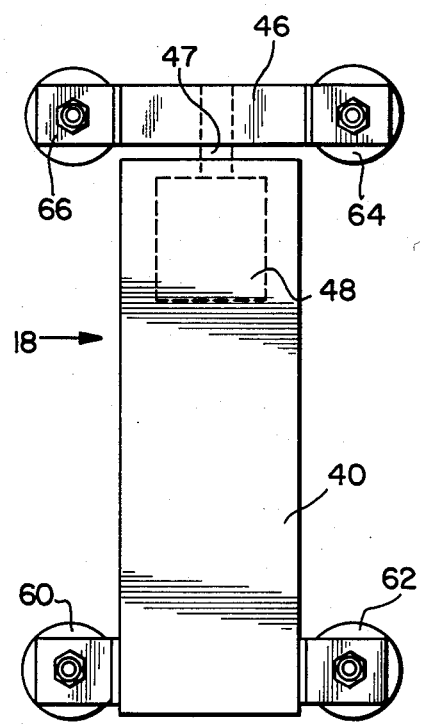
FIG. 3 is a plane view of an angle measuring device forming part of the wheel alignment apparatus.
Figure 4:
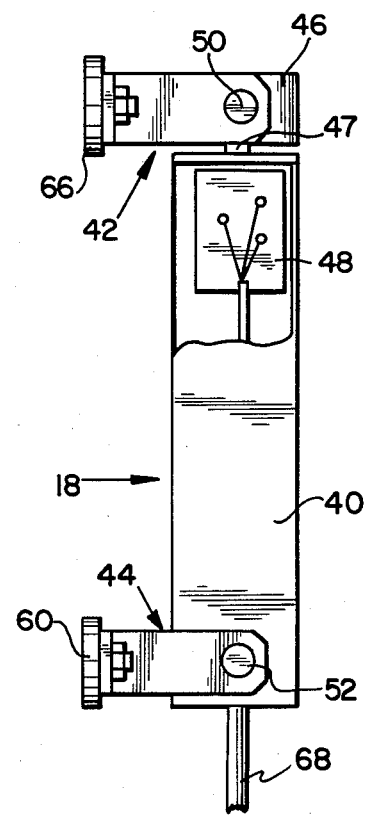
FIG. 4 and 5 are a side view and an end view, respectively, of the angle measuring device of FIG. 3.
Figure 5:
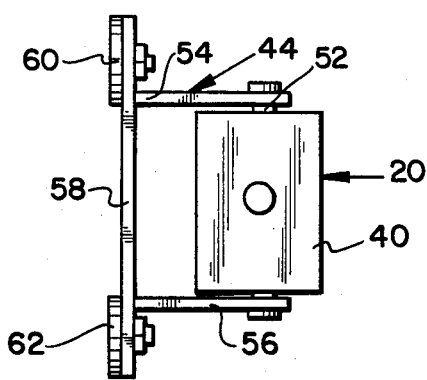
Figure 6:
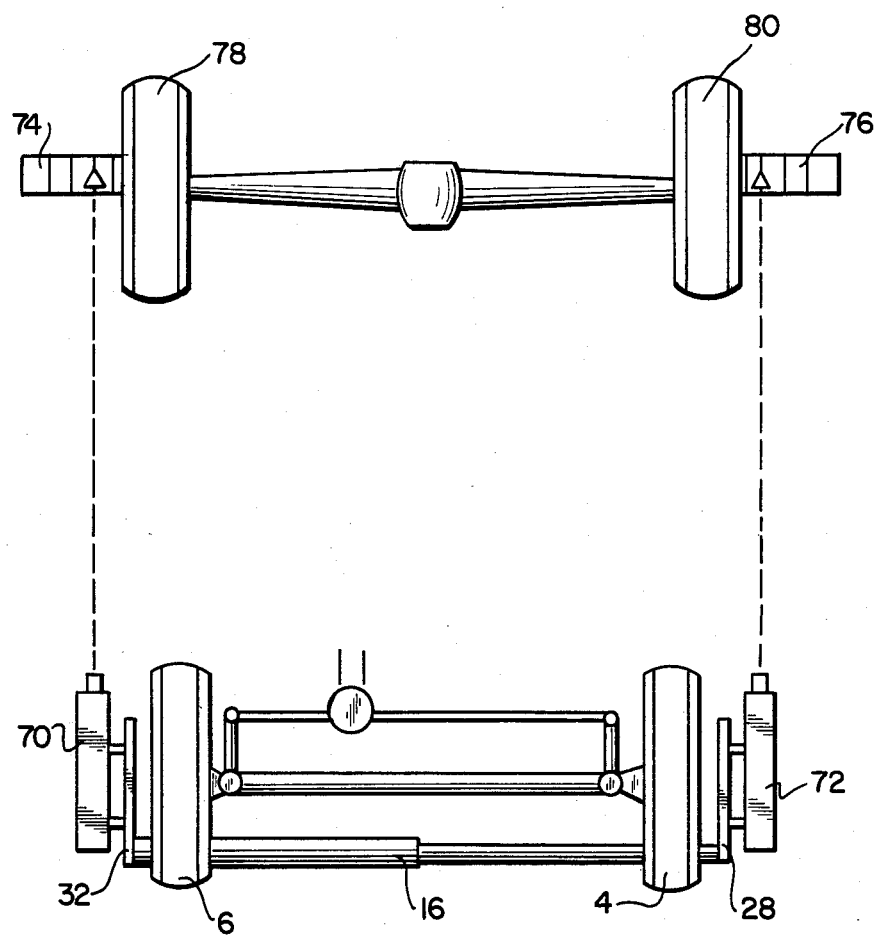
FIG. 6 is a diagrammatic plan view of the two axles of a motor vehicle with the instrumentalities for lining up the connection yoke in relation to the axis of symmetry of a motor vehicle.

One of the angle measuring devices 18, 20, 22 and 24, viz., the angle measuring device 20 is to be seen separately in FIGS. 3 to 5. The angle measuring device 20 comprises a housing 40 with two stands 42 and 44 mounted on its two opposite ends. The stand 42 is mounted on a head 46, that is joined to the shaft 47, aligned with the longitudinal center axis of the housing 40, of a rotary potentiometer 48. Consequently the stand 42 is mounted so that it may pivot about the longitudinal axis of the housing 40. The rotary potentiometer functions as an angle transducing unit, that senses the amount of pivot of the head 46 and accordingly of the stand 42 about the longitudinal axis of the housing. The stands 42 and 44 are furthermore supported so that they may pivot about shafts 50 and 52, that are perpendicular to the longitudinal axes of the housing 40. This being so, the distance between the planes of the surfaces of the gage disks and those of the measuring plates 28, 30, 32 and 34 may be equalized and the shaft 47 of the rotary potentiometer 48 kept free of stresses.

As will be seen from FIG. 5, the stand 44 has side lugs 54 and 56 extending from the pivot shaft 52, bearinged in the housing 40, as far as a ground plate 58, that is broader than the housing 40 in order to have a broader base of measurement. Underneath the ground plate 58 two permanent magnets 60 and 62 are mounted. The stand 42 is designed like the stand 44 and also has two permanent magnets 64 and 66. With the aid of such permanent magnets 60, 62, 64, and 66 the angle measuring device 18 may be mounted on the gage disk 8 on the one hand and the measuring plate 28 on the other hand and be maintained in such position, if the gage disks and measuring plates are made of iron or like magnetic material. This makes it possible for the angle measuring devices to be quickly put on and taken off, while at the same time giving the user a certain degree of freedom with respect to the selection of the position on which the angle measuring devices are to be placed and simplifying machining of the surfaces of the gage disks and plates. In place of using permanent magnets for mounting it would however be possible to use other guiding and gripping fittings such as sliding shoes or prismatic mounting rails in order to fix the angle measuring devices on the gage disks and measuring plates.

The angle measuring devices 18, 20, 22 and 24 (see FIGS. 1 and 2) are used to ascertain the toe-in angle and camber on the basis of the angles of the planes of the gage disks 8 and 10 in relation to the measuring plates 28, 20; 32 and 34s.

When the yoke 16 is placed normal to the longitudinal axis of the vehicle, the angle measuring devices 18 and 22, placed vertically, serve to measure toe-in, viz., they measure the angle of the gage disks 8 and 10 in relation to the horizontal measuring plates 28 and 32.

When placed horizontally the angle measuring devices 20 and 24 are used to ascertain the true camber value, viz., they measure the angle made by the gage disks 8 and 10 to the vertical measuring plates 30 and 34. Since the wheels and the yoke 16 are very close together in the same plane in this method of measuring camber application to a horizontal surface or measuring position is not essential, viz., the measuring operation may be undertaken outside the workshop.

The separate toe-in values or data applying for the straight-ahead position of the steering gear are precisely sensed by the rotary potentiometers, if the yoke 16 is at a right angle to the axis of symmetry of the vehicle in question, because then the measuring plates 28 and 32 will be parallel to the axis of symmetry.

If the gage disks and the measuring plates do not stand at an angle to each other in the horizontal or vertical plane, the potentiometers of the respective angle measuring devices will yield an output signal of "0". If the gage disks and the measuring plates stand at an angle to each other, then on putting the angle measuring devices in place the shaft of the respective potentiometer will be correspondingly turned so that the output signal thereof represents the angle measured. The signals stemming from the potentiometers go by way of lines (as for example 68 in FIG. 4) to a central processor and are converted there, as will be explained later in what follows.

One condition for measuring the toe-in of one wheel is that the yoke 16 be set perpendicular to the axis of symmetry of the motor vehicle. In order to set the yoke in this position two removable projectors 70 and 72 are mounted on the measuring plates 28 and 32. The beams of the two projectors are directed towards the scales 74 and 76, that will have been mounted on the rear wheels 78 and 80 of the motor vehicle. The readings appearing on these scales 74 and 76 will then indicate the position of the yoke 16 in relation to the axis of symmetry of the motor vehicle and the yoke 16 may be moved by trial and error till the values on the two scales 74 and 76 are equal. When the yoke 16 is set up in this position and the steering is in the straight-ahead position, the separate toe-in value may be read off from the display instruments of the processor.

The above-described measuring apparatus may be used for ascertaining the following values: individual toe-in on the right and left wheels, overall toe-in of the front wheels, camber left and right.

An account will now be given of a case in which the gage disks 8 and 10 are not applied so as to be fully parallel to the contact faces of the wheel mount members on which the wheels are clamped, viz., the possibility of wheel wobble is envisaged in the mensuration operation. Such wheel wobble is to be taken into account in mensuration because in the case of the form of the invention as described so far, the gage disks 8 and 10 are mounted on the wheels (rather than on the said wheel mount member) by way of mounts 26.

Figure 2:
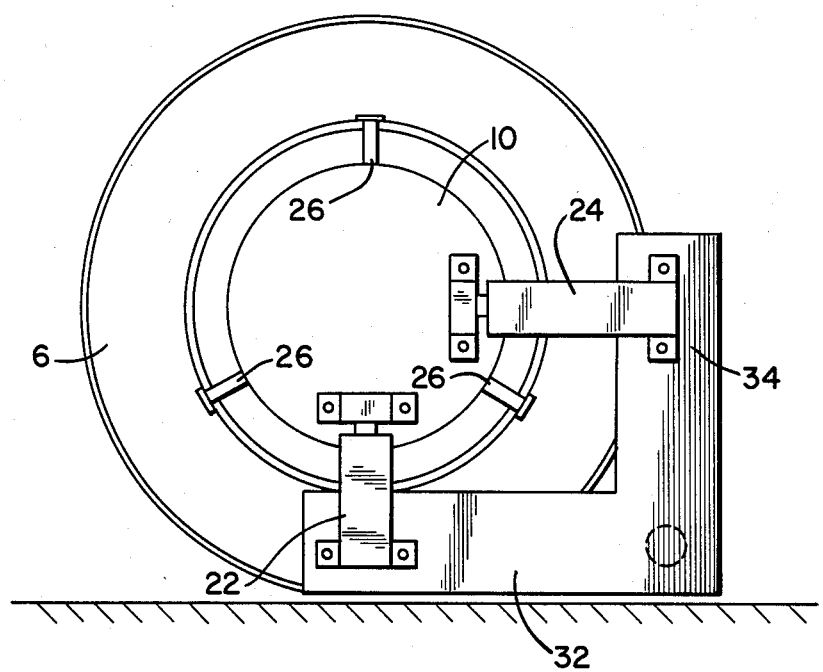
FIG. 2 is a diagrammatic side view of a front wheel of a motor vehicle with such measuring apparatus.

In order to take wheel wobble into account after aligning the yoke 16 and after assembly of the gage disks 8 and 10, the angle measuring devices 18, 20, 22 and 24 are put in place in the way described with reference to FIGS. 1 and 2. Readings are taken from the angle measuring devices and recorded or otherwise stored. Thereafter the angle measuring devices are dismounted and the vehicle so shifted that the wheels turn through 180°. Firstly the yoke 16 and then the angle measuring devices are put in position again. The readings taken in the second mensuration operation are set off against those produced in the first measuring operation in a known way in order to cancel out wheel wobble.

Instead of shifting the vehicle, as a way of turning the wheels, between the two measuring operations it is possible for the wheels to be turned through 180° while supported on rollers.

The two wheels are each supported on two rollers that are slowly turned by two electric motors. Such a construction will naturally speed up the measuring operation, but it does tie operation of the apparatus to the availability of appropriate workshop facilities. If on the other hand a brake testing apparatus is available, such a method will be readily feasible in conjunction therewith. Such a brake testing apparatus has slowly turning rollers for rotating the wheels, and the electrical part of the brake testing machine may, with a small extra cost, be so designed that a wheel pair to be tested is rotated through exactly 180°.

Figure 7:
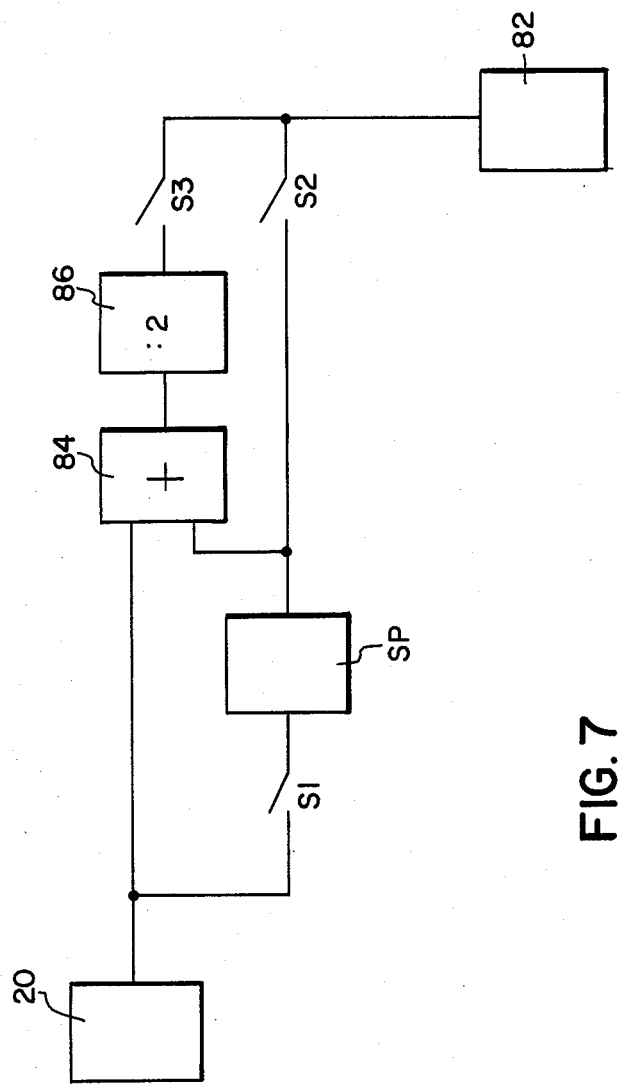
FIG. 7 is a schematic of a control unit for the measuring apparatus of FIG. 1.

An electrical circuit for undertaking the measuring operations as described above is to be seen in part and diagrammatically in FIG. 7. The output signal of an angle measuring device 20, that is marked diagrammatically in FIG. 7, goes by way of a switch S 1 to a storage circuit SP and thence proceeds via a switch S 2 to an indicator 82. The output signals of the angle measuring device 20 and of the memory SP are further supplied to an adder circuit 84, thence to a divider circuit 86 and via a further switch S 3 are passed on to the indicator 82 as well. An account will now be given of the measuring operation using this circuit. During the first mensuration operation the switches S 1 and S 2 are closed so that the value measured or output signal goes from the angle measuring device 20 to the indicator 82 and is displayed there. During the second operation the switch S 3 is closed and the measurement data coming from the angle measuring device 20 and the memory SP are added in the circuit 84 and divided by two in the circuit 86 and then read out in the indicating device. In the mean value as now displayed of the two values the wobble factor will have been canceled out. The circuit of FIG. 7 is naturally present as well for the other angle measuring devices. Further circuit stages may be present in order to compute the individual toe-in values for the front nearside and offside wheels and the overall toe-in with respect to the front wheels.

It is an advantage if the output signals of all four angle transducing units are supplied to a processor in which they are so switched that the results may be displayed on a digital instrument selectively.

The circuits with which the influence of the wheel wobble is corrected for by averaging out are only necessary if the gage disks 8 and 10 are mounted on the wheel. However for certain motor vehicles there is a special design to make it possible for the gage disks 8 and 10 to be mounted so as to be precisely parallel to the wheel mount member. If the gage disks 8 and 10 are placed so as to be exactly parallel to the wheel contact faces, then in the case of the above described embodiment of the measuring apparatus of the invention it is sufficient to perform only one mensuration operation rather than two between which the wheels are turned. Consequently the circuit of FIG. 7 will then be simpler and it is only necessary to derive the algebraic sum of the single toe-in values in order to get a reading for the overall or bilateral toe-in.

Figure 8:
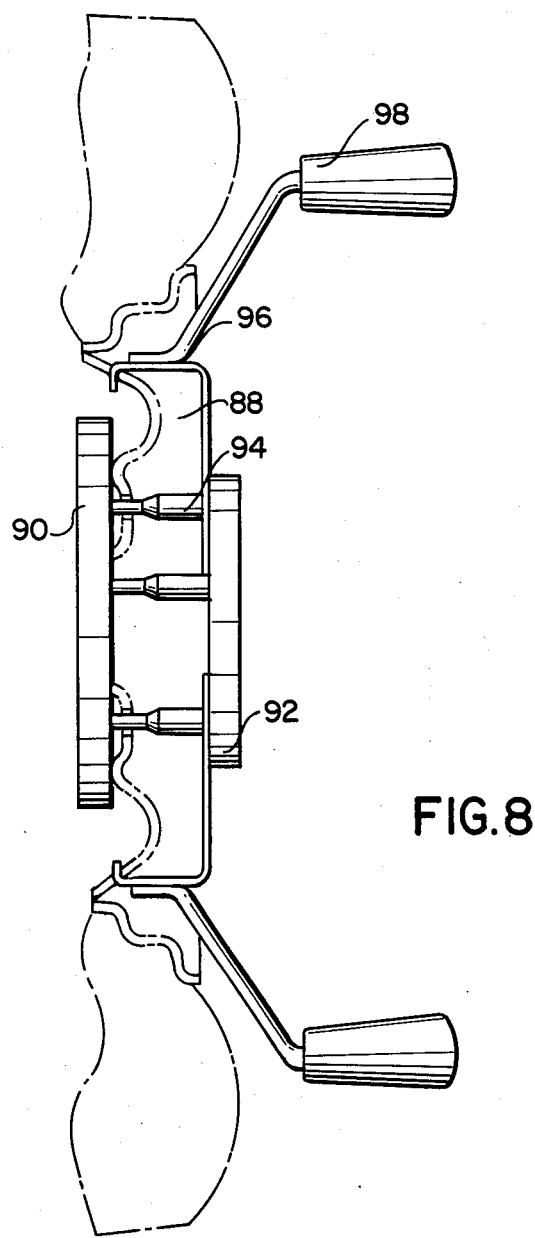
FIG. 8 shows a section taken through a wheel mount member and a gage disk in accordance with the invention.

With reference to FIG. 8 an account will now be presented of a further working example of the measuring apparatus, that is is well suited for use on motor vehicles, whose gage disks 8 and 10 are capable of being mounted wobble-free at a right angle to the wheel axis of rotation, i.e. parallel to the wheel contact face. In the case of this design the wheels 88 have holes accessing the wheel mount member 90. The gage disk 92, which in its function represents the gage disk 8, has protruding studs 94 on its side facing the wheel mount member, such studs being equal in length to a tight tolerance and being present in a number equal to the number of such holes and having the same pitch circle as such holes. The gage disk 92 with the studs 94 is loaded using known tools 96 with handles 98 against the wheel mount member 90 so that the studs 94 make contact. The gage disk 92 will then be exactly at a right angle to axis of rotation of the wheel so that there will be no necessity to compensate for wheel wobble by turning the wheel through 180° and taking two sets of readings. It is furthermore not necessary to store the data stemming from a first measuring operation for a second one.

Since in the this construction it is only necessary to take four readings in one mensuration operation, the measuring apparatus may be generally simplified by having only one angle measuring device, in lieu of four thereof, that is put in place sequentially, i.e. in turn, vertically and horizontally on the nearside front wheel and then vertically and horizontally on the orifice front wheel in order to measure toe-in and camber. For such an application the angle measuring device may be of a mechanical design as particularized above. The electrical side of the apparatus would then be in the form of a battery and a display instrument fitted on the angle measuring device itself so that on applying the angle measuring device a reading would be produced and would be able to be directly read off. In addition to this it would be necessary to have a two-way switch making it possible to display one and the same angle reading or data output signal as a positive deviation and as a negative deviation dependent on the respective side of the vehicle. In fact on taking readings for four points of measurement with a single instrument a positive toe-in value for the nearside wheel in the case of the angle measuring device 20 will lead to a clockwise turning of the head 46 in relation to the housing 40 and in the case of a positive toe-in of the offside wheel it will lead to a counterclockwise twist. Positive camber of the nearside wheel will produce a counterclockwise rotation of the head 46 and a positive camber of the offside wheel will result in rotation to the right. The position of the two-way switch is thus identical in the case of the following measurements: offside toe-in and nearside camber, nearside toe-in and offside camber. The respectively appropriate setting of the two-way switch may be indicated by suitable lettering.

As has been made clear above, the angle measuring devices are mounted either vertically or horizontally between the gage disks 8 and 10 and the measuring plates. In order to facilitate the vertical and horizontal alignment of the angle measuring devices the same may be furnished with spirit levels (not illustrated).

I claim:

1. A wheel alignment measuring apparatus for use on a pair wheels of a motor vehicle comprising:
    gage disks adapted to be applied to said vehicle adjacent to said wheels at right angles to the respective axes of rotation thereof,
    a support yoke adapted to be placed athwart said vehicle adjacent to said pair of wheels,
    measuring plates mounted on said yoke at right angles thereto and extending horizontally as far as points under said respective gage disks when said yoke is located in an operational position athwart said vehicle,
    at least one angle measuring device being made up of a housing, a head pivotally mounted on said housing for rocking motion about an axis of said housing, and an angle transducer joined to said head for sensing rocking motion thereof and providing an output signal representative of such rocking motion,
    said angle measuring device being adapted to be removably mounted with said housing on said measuring plate and with said head on said gage disk with said housing axis being orientated essentially vertical to sense an angle related to toe-in.

2. The apparatus as claimed in claim 1 comprising further measuring plates mounted on said yoke at right angles thereto, said further measuring plates extending upwards to the side of said gage disks when said yoke is in its operational position as applied to said vehicle, said angle measuring device furthermore being adapted to be removably mounted with said housing on said further measuring plates and with said head on said gage disk with said housing axis being orientated essentially horizontal to sense an angle related to camber.

3. The apparatus as claimed in claim 2 comprising such angle measuring device mounted on said horizontally extending measuring plate with its housing axis vertical and engaging said gage disk to sense a toe-in angle of said gage disk in relation to a surface of said measuring plate, and one such angle measuring device mounted on one of said further measuring plates with its said housing axis horizontal and engaging one of said gage disks for measuring camber.

4. The apparatus as claimed in claim 3, wherein said housing of said angle measuring device comprises probes adapted to pivot about axes perpendicular to said housing axis.

5. The apparatus as claimed in claim 2, wherein said housing of said angle measuring device comprises probes adapted to pivot about axes perpendicular to said housing axis.

6. The apparatus as claimed in claim 1 wherein said housing and said head of said angle measuring device comprises stands adapted to pivot about axes perpendicular to said housing axis.

7. The apparatus as claimed in claim 1 wherein said transducer comprises a rotary potentiometer.

8. The apparatus as claimed in claim 1 wherein said gage disk and said measuring plate are made of magnetic material, said housing and said head of said angle measuring device comprise stands adapted to pivot about axes perpendicular to said housing axis, and said stands comprise magnet means for magnetically adhering to said gage disk and said measuring plate.

9. The apparatus as claimed in claim 1 comprising an angle indicator and an electric signal processing circuit for signals from said angle transducers taking the form of rotary potentiometers and driving said angle indicator.

10. The apparatus as claimed in claim 9 wherein said electrical signal processing circuit comprises a two-way switch for the selective indication with corresponding plus and minus designations of readings pertaining to wheel alignment data.

11. The apparatus as claimed in claim 1 comprising optical beam projectors and mounts therefor on said measuring plates to align said yoke.

* * * * *